April 11, 1961 W. H. P. POULIART ET AL 2,979,244

RECORD TAPE ASSEMBLY AND MAGAZINE THEREFOR

Filed Dec. 13, 1956 4 Sheets-Sheet 1

*Inventor*
W. H. P. POULIART -
L. JACOBIN
*By* [signature]
*Attorney*

April 11, 1961 W. H. P. POULIART ET AL 2,979,244

RECORD TAPE ASSEMBLY AND MAGAZINE THEREFOR

Filed Dec. 13, 1956 4 Sheets-Sheet 2

Inventor

W.H.P. POULIART - L.JACOBIN

By R.F. Morris

Attorney

RECORD TAPE ASSEMBLY AND MAGAZINE THEREFOR

Filed Dec. 13, 1956

*Inventor*

W. H. P. POULIART - L. JACOBIN

By *[signature]*

*Attorney*

Inventor
W. H. P. POULIART – L. JACOBIN
By R P Morris
Attorney

United States Patent Office 2,979,244

Patented Apr. 11, 1961

2,979,244

RECORD TAPE ASSEMBLY AND MAGAZINE THEREFOR

Willy H. P. Pouliart and Leo Jacobin, Antwerp, Belgium, assignors to International Standard Electric Corporation, New York, N.Y., a corporation of Delaware Filed Dec. 13, 1956, Ser. No. 628,148

Claims priority, application Great Britain Dec. 30, 1955

5 Claims. (Cl. 226—118)

Figures 1, 3:
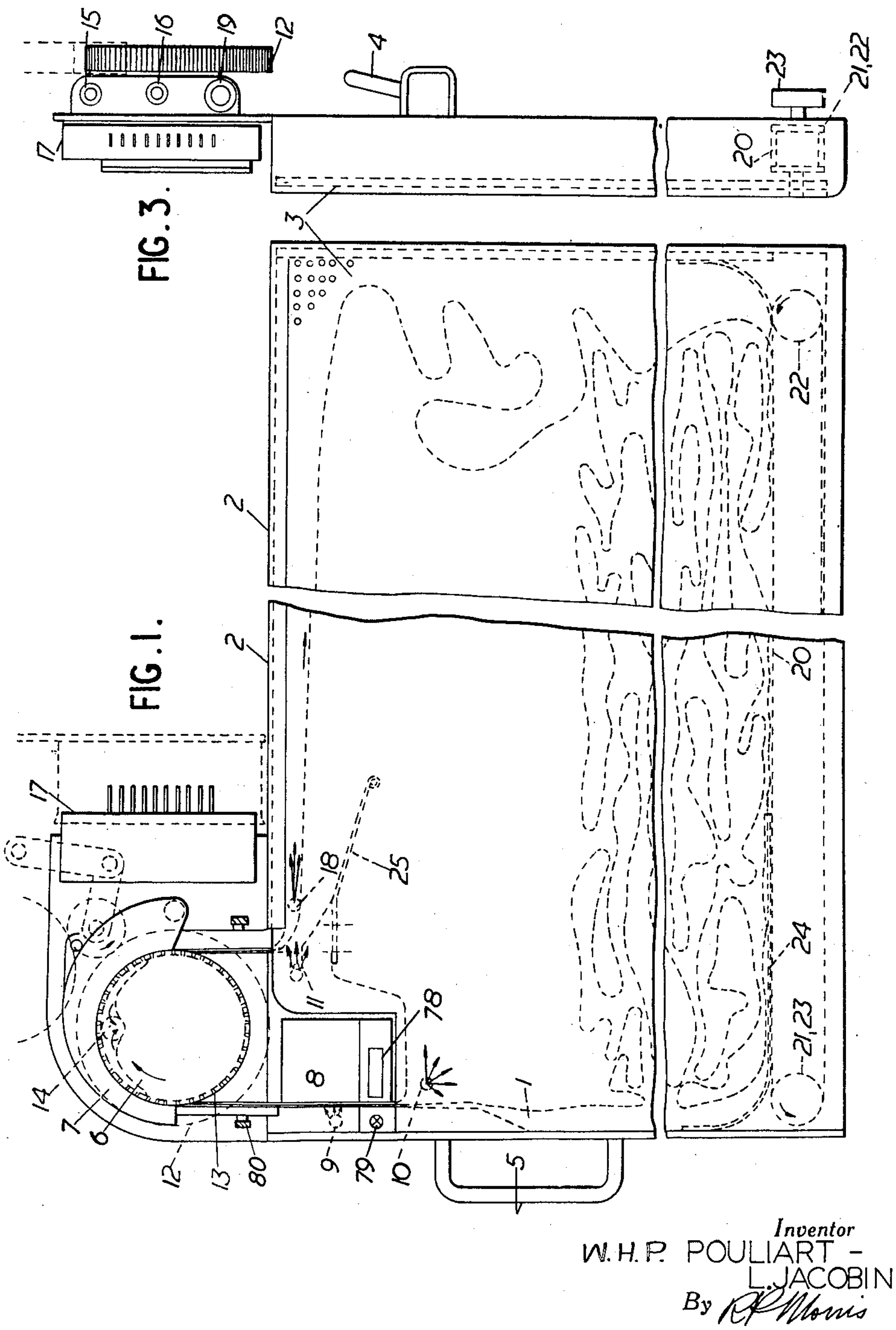

The invention relates to tape containers and associated winding and control equipment for handling record tape such as is used for magnetic recording machines.

More particularly, the invention relates to a magnetic record tape container comprising a driving device for the said magnetic tape to permit reading and printing, a store in the form of a flat container of which the inside width is slightly greater than the width of the magnetic tape, and in which the latter circulates as an endless loop and is contained therein in the form of successive folds, and electrically controlled pneumatic control means for the magnetic tape in said store.

The principle of the above container is disclosed in the Belgian Patent No. 518,759 while a driving capstan with which the magnetic tape may cooperate under the control of an electrically operated pneumatic clutch is disclosed in the Belgian Patent No. 517,967.

An object of the invention is to be able to increase the recording capacity of such an arrangement by increasing the surface of the endless tape, particularly by using a greater length of tape.

In accordance with a characteristic of the invention, a conveyor is provided at the bottom of the store, which conveyor returns the mass of magnetic tape folds from the end of the store, at which the tape is deposited after its passage through the driving device, towards the other end.

In the Belgian Patent No. 523,526, a magnetic record tape container comprising a driving device for the tape, and a store in the shape of a flat magazine containing the tape in the form of an endless loop and with successive folds, includes a discharge of air underneath the said tape as it leaves the said driving device, this for the purpose of ensuring a tape trajectory at the output of the driving device which is substantially horizontal and linear.

Another object of the invention is to improve the above arrangement particularly in the case of a store of greater length, due to the increased length of the endless tape, by prolonging said substantially horizontal and linear trajectory of the tape over substantially the whole length of the container and also to avoid any sticking of the tape on the upper part of said store, said tape leaving the driving device at a point along said upper part.

In accordance with another characteristic of the invention, a further discharge of air is provided above the magnetic tape in the upper part of the store and as the tape leaves the driving device, the direction of said further discharge of air being substantially horizontal and having for result the creation of a depression which, in cooperation with the air pressure existing underneath the magnetic tape, projects the latter from the output of the driving device located at one end of the store towards the other end of the store, while on the other hand it prevents sticking of the magnetic tape on the upper part of the store.

Yet another object of the invention is to further increase the capacity of recording of such arrangements as mentioned above by using a plurality thereof but with a single common driving device.

In accordance with yet another characteristic of the invention, magnetic record tape containers of the type defined above are grouped on a common chassis, the said chassis and the same containers being provided with automatic electrical, mechanical and air plug-in couplings, the said chassis further comprising along its lower part rollers which provide a rolling path for the insertion of the container units, the said chassis comprising further rollers laterally guiding the said container units towards the said couplings, and the said chassis yet comprising on one of its lateral sides a retractable table provided with yet further rollers which are aligned with those providing the rolling paths at the lower side when the said table is lowered into a horizontal position to permit the easy insertion of the container units in the chassis, said table being eventually returned to its normal vertical position after insertion of the containers.

Figure 2:
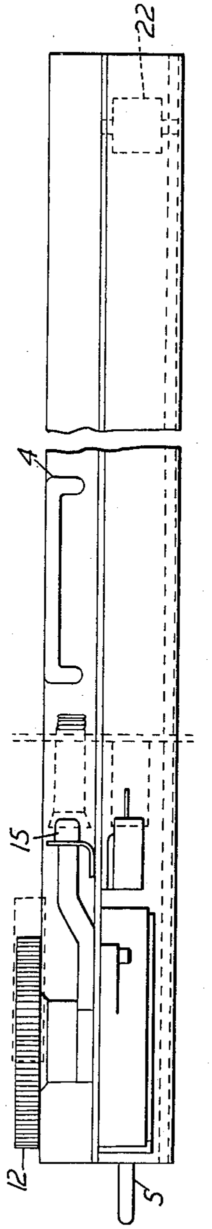
Figure 4:
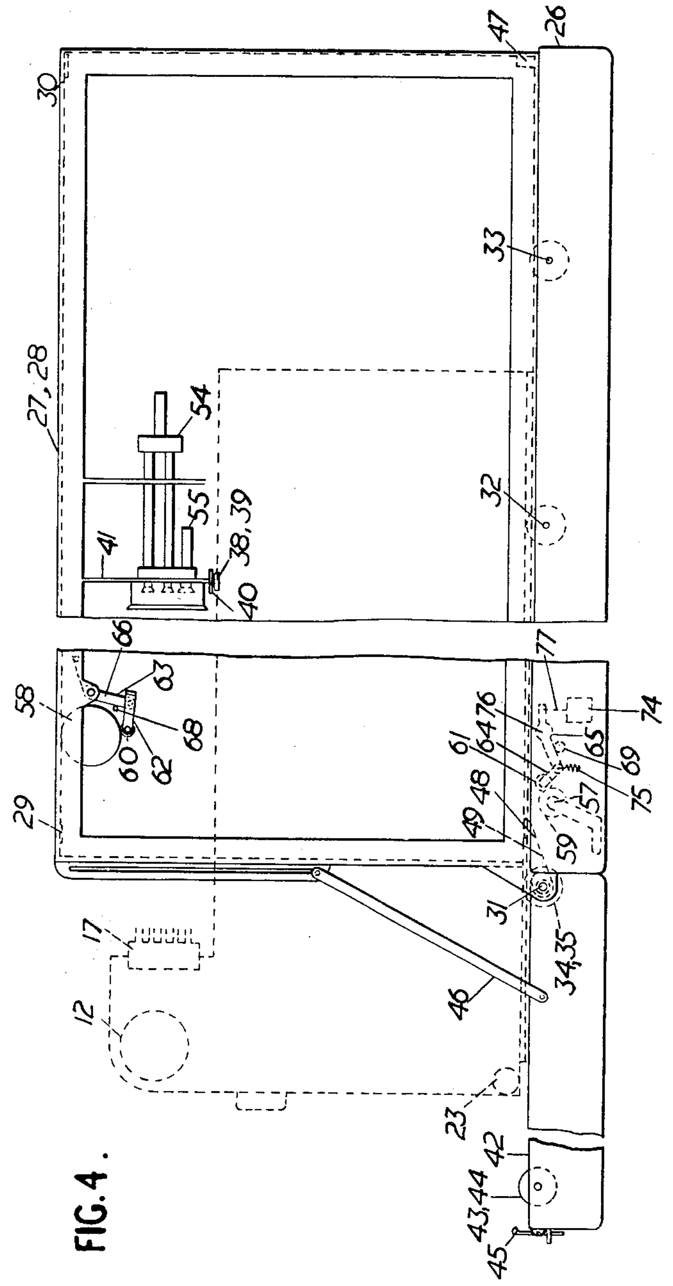
Figure 5:
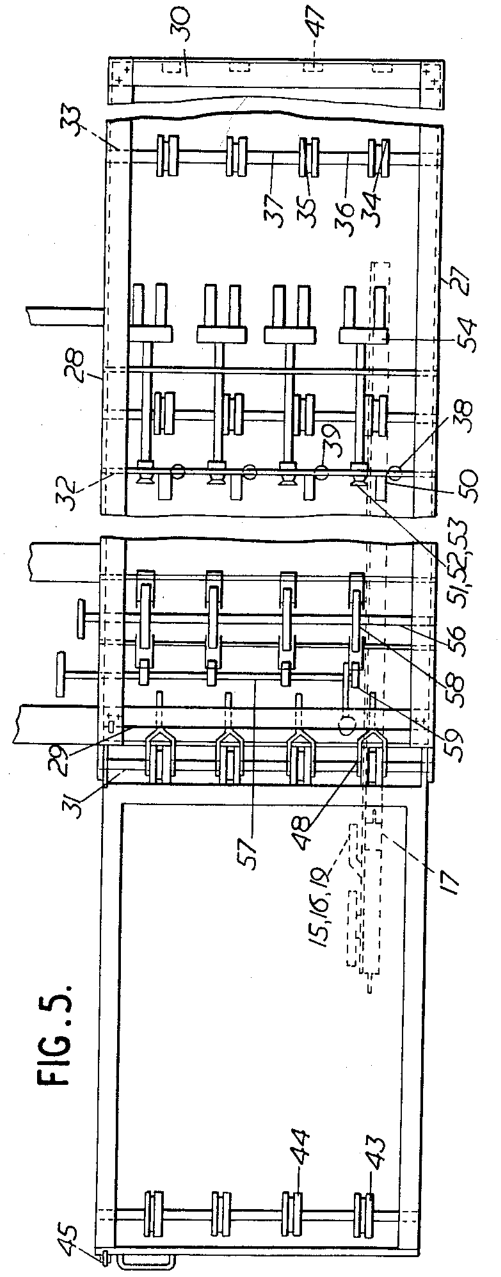

The above mentioned and other objects and characteristics of the invention will be better understood from the following description of an embodiment of the invention to be read in conjunction with the accompanying drawings which represent:

Fig. 1, a detachable memory unit in accordance with the invention in side elevation partially cut away;

Fig. 2, the memory unit of Fig. 1 in plan view looked at from above;

Fig. 3, the memory unit of Fig. 1 in side elevation looked at from the right;

Fig. 4, a memory chassis in side elevation with one memory unit indicated in position in dotted lines;

Fig. 5, the chassis of Fig. 4 in plan view looked at from above.

The composite memory of which the following is a description consists of several single memories formed by detachable units mounted on a fixed chassis. The word memory in this instance is used to define a device where information can be fed and removed at a later date as in the subject invention.

Each detachable unit constitutes a memory in which signals may be registered on a magnetic tape and from which the signals may be extracted at any desired time.

The tape which is endless, is contained in a magazine which is a vertical rectangular box having a width slightly larger than the width of the tape and in which the tape forms a large number of loops uniformly distributed. It passes through a mechanism mounted on the magazine, where it is advanced generally by small steps, due to the high density of recording of magnetic signals, on the reading (or writing) of signals. This movement is effected by a capstan consisting of a continuously rotating pulley and a fixed segment partially conforming to the shape of the pulley. The advancement and stopping of the tape occurs by a pneumatic clutch on the pulley or on the fixed segment. The reading (or writing) of a signal is effected by a movement of magnetic heads delimiting parallel tracks on the tape.

The capstan guides the tape into the magazine and withdraws it. In order that this may be done without either distorting the signals or breaking the tape, it is necessary that the latter should be distributed regularly in the magazine, and this is done by the following means:

(1) Return of the bundle of tape loops in the magazine towards the capstan by means of a transport band in the base of the magazine. This band is fed in such a manner that the advancement imparted to the bundle of tape is automatically regulated according to the quantity of tape moved by the capstan.

(2) Guiding and smoothing of the tape at entrance and exit of the capstan by a curent of air.

The detachable units are mounted on a chassis where they are arranged on horizontal guides. To be placed in position the units are placed on a balancing extension of the guide, and pushed into place. Finally, connection is made by mechanical, electrical and pneumatic means with the chassis.

For this purpose the chassis is provided with rotating elements for the transmission of movement, with a pneumatic system with valves for pneumatic control, and with a set of wires for the transmission of signals on an electric circuit.

In Figs. 1, 2, and 3, the tape 1 which is made endless by sticking the ends together (as will be explained later) is placed in a narrow box 2 (called a magazine) in which it takes up most of the volume. As shown, it forms a pile of substantially parallel loops resting one on the other. The front side of this box consists of a sliding window 3, to permit the arrangement and the control of the sensitised tape. The box is provided with carrying handles 4 and 5 and its shape is so arranged as to permit its introduction on to the chassis guides.

The tape 1 traverses the recording (reading) and advancing mechanism, which consists of a continuously rotating pulley 6 effecting the advancement of the tape, a detachable segment 7 effecting the stopping of the tape, a multiple magnetic head 8 effecting the recording or reading of the tape, a photo-electric cell 78 associated with a source of light 79, a mouthpiece 9 discharging a current of air holding the tape permanently against the magnetic head, a mouthpiece 10 discharging a current of air as shown for smoothing the tape at the entrance of the mechanism, a mouthpiece 11 discharging a current of air for deflecting the tape as it leaves the mechanism.

The pulley 6 is in continuous rotation in the direction of the arrow, being integral with a second pulley 12, which receives its movement from the rotating elements of the chassis as explained later. The tape follows part of the contour of the pulley 6 and is taken up by or ejected from the pulley by pneumatic action under the control of a pneumatic valve (not shown) advancing or stopping the tape. For this purpose the pulley 6 is formed by a ring 13 provided with perforations through which air is passed in either direction by compression or suction and directed by the fixed mouthpiece 14 towards the tape. This mouthpiece 14 is connected to the penumatic valve by means of the pneumatic plug 15.

The operation of the pulley 6 is completed by the action of a fixed but detachable segment 7 of which the lower face which partially surrounds the rotating pulley is provided with perforations which pass the air under compression or suction as controlled by the pneumatic valve to repel or attract the tape.

The segment is conected to the valve by means of the pneumatic plug 16.

When the tape is withdrawn or pushed back by the pulley 6, these actions are reinforced by repulsion or attraction caused by the segment 7. By these combined actions, and as described in the above mentioned Belgian Patent No. 517,967, rapid starting and stopping is obtained, e.g. about two milliseconds for a tape speed of four metres per second.

The multiple magnetic head 8 is a unit (not detailed) consisting of several magnetic heads, traversing the parallel tracks on the tape and which transmit signals when the tape moves. The photoelectric reader comprising the cell 78 and the light source 79 is arranged in the path of the magnetic tape, for example underneath the magnetic reading and writing heads, and its purpose is to provide to the electrical circuits a signal during the passage of a mark, constituted for example by a small surface where the magnetic tape has been made transparent, just before the splice of the two ends of the tape. The purpose of this signal may be to continue driving the magnetic tape, but to interrupt the writing or reading operations during a time corresponding to the passage of the said splice in the driving mechanism. Another object may be to mark the separation between the end and the beginning of a cycle of informations magnetically inscribed on the tape.

The head and the photocell are connected to terminals of the plug 17 which makes contact with the circuit.

The blown air emanating from mouthpiece 9 holds the tape permanently against the multiple head 8, to permit obtaining satisfactory signals.

Blown air emanating from another mouthpiece 10 smooths the tape to prevent it from obstructing the entrance to the mechanism by tangling the loops.

Blown air emanating from a further mouthpiece 11 deviates the tape at the exit of the mechanism and directs it towards the opposite end of the magazine. This action is reinforced by the depression created around it by the flow of air projected by the mouthpiece 18. This last airflow has also for purpose to prevent the tape from sticking against the upper part of the container.

A small partition 25 has been added under the airflow provided by the mouthpiece 11, on the one hand to avoid that the folds of tape located in the container should be sucked by the depression occurring around this airstream, and on the other hand to reinforce the projection of air towards the other end of the container.

The mouthpieces 9, 10, 11 and 18 are connected to a source of compressed air by means of the pneumatic plug 19.

The sensitised tape is fed at the opposite end of the magazine to a reading mechanism by a transport band 20 which is wound on the pulleys 21 and 22, the pulley 21 being integral with a pulley 23 which receives its movement from rotating elements of the chassis as explained later.

The linear speed of this conveying belt may be substantially equal to the length of the container divided by the time necessary for the passage of the complete length of the endless tape on the capstan when the latter continuously drives the tape.

Although the transport band 20 advances at a constant speed, the bundle of sensitised tape progresses at the speed of its intermittent passage through the reading and recording mechanism, which prevents pulling or piling up of the tape. For this purpose the carrying band is made smooth, permitting the sensitised tape to slide when it traverses the mechanism at a reduced speed. In addition the carrying band is extended by a fixed surface or plane 24 contributing to the complete immobilization of the bundle of sensitised tape when the latter is stopped in the reading mechanism.

Suitable positioning of the bundle of sensitised tape is obtained by the choice of speed of the carrying band as indicated above and by an empirical determination of the length of the fixed surface 24, which must be such that a certain quantity of magnetic tape can be pushed on this plane 24 by the mass of tape which is still on the belt 20, until the first folds of the magnetic tape have arrived against the front side of the container, and until at this moment the mass of tape located on the plane 24 is able to substantially stop the remaining part of the tape located on the belt 20, the latter then sliding underneath the mass of magnetic tape.

The chassis for four detachable elements shown in Figs. 4 and 5, consists of a base frame 26 on which are mounted the frames 27, 28 and which are connected by cross-pieces 29 and 30. The base 26 is provided with three shafts 31, 32, and 33 on which the wheels such as 34, 35 pivot freely, separated by the cross-pieces such as 36, 37. The wheels are arranged so as to form rolling tracks for the reception of the detachable units. To guide the units in a vertical plane, supplementary wheels such as 38, 39 have been provided, mounted on the edge 40 of a mounting plate 41, fixed to the frames 27 and 28.

To simplify the insertion and extraction of the units, a platform 42 has been provided with wheels such as 43, 44 the platform 42 pivoting about the axis of shaft 31. Normally the platform is kept in a vertical position by a holding pawl 45. On the insertion or extraction of a unit the platform is pivoted and held in the base extension 26 by means of a tie-bar 46. The wheels such as 43, 44 are then aligned with the wheels of the chassis 26, and form a firm seating for the detachable units, which prevents them from moving and damaging the apparatus. A detachable unit partly inserted on the chassis is shown dotted in the figure.

A detachable unit having slid into position, it finally abuts against a stop of compressible material 47 and is locked by a holding pawl 48 which is controlled by the spring 49.

Finally connection is made by electric, pneumatic and mechanical means. For this purpose the electric plug 17 and the multiple pneumatic plug 15, 16, 19 of the detachable unit are inserted respectively into the electric socket 50, and the multiple pneumatic socket 51, 52, 53 mounted on the mounting plate 41. The electric socket 50 leads to the electric circuit, while the multiple pneumatic socket 51, 52, 53 is connected to the pneumatic valve 54 and to the source of compressed air 55. The other detachable units are connected to the chassis in the same manner.

To provide power to the detachable units the chassis 26 carries shafts 56 and 57 which are continuously rotated and are equipped with pulleys 58, 59 connected to these units. On the insertion of the units into the chassis, pulleys such as 58 are automatically coupled to pulleys such as 12, by the intervention of friction wheels such as 60. The latter are floatably mounted on joints 62 and 63 and are wedged between the pulleys 12 and 58 partly under the influence of springs such as 66 and partly under the influence of the adhesion of the floating surfaces. When the units are extracted from the chassis, the friction wheels such as 60 disengage from the pulleys such as 12 and springs such as 66 support levers such as 63 in a rest position against the stops such as 68.

Concerning the pulley 23, it is driven by the pulley 61 in a manner analogous to that for 12 and 60, with this distinction that the pulley 61 comes into contact with the pulley 23 only when the solenoid 74 (schematically represented) is energised. When a suitable current is sent through the solenoid 74, its plunger 77 is drawn downwards against the action of the restoring spring 75, and lowers the right-hand end of the lever 65 which pivots around its fixed axle 76. The left-hand end of this lever comes up, and as it bears the lever 64 which itself supports the pulley 61, the latter is then pressed against the pulleys 23 and 59. When the current in the solenoid 74 is suppressed, the spring 75 lowers the left-hand end of the lever 65 which then abuts against the fixed member 69, and the pulley 23 is no longer driven by the pulley 61.

The purpose of this clutch arrangement is to drive the conveying belt 20 only when the memory unit concerned is selected by the electrical circuits for the purpose of inscribing or reading information, whereby an unnecessary and objectionable friction of the belt 20 on the magnetic tape is avoided during the remaining periods.

The loading of the magazine, which may be performed on a chassis kept specially for this purpose, may take place as follows:

The power is cut off by disengaging the friction wheels 60 and 61 and the air is cut off by closing taps placed on the air supply pipes. The window 3 is then slid to the right to the extent that the partition 25 is freed and the movable segment 7 can be removed. The tape which is wound on a spool (not shown) is partially unwound so as to be passed over the pulley 6 and inserted into the magazine through the slot next to the reading head and fastened by a tension screw 80.

The movable segment 7 and the window 3 are then closed and the unit is fed with air by opening the air supply taps, and with power by engaging the friction wheels 60 and 61. The sensitised tape is then automatically wound in the magazine. The quantity of tape on the spool may be under the control of an electric contact, the sensitised tape may then be automatically stopped when the spool is empty by the operation of the pneumatic valve controlling the advancement. Then the tape is cut and the screw 80 is unfastened, which permits sticking the two ends together by welding. The unit is then ready for use.

While the principles of the invention have been described above in connection with specific apparatus, it is to be clearly understood that this description is made only by way of example and not as a limitation on the scope of the invention.

We claim:

1. A record tape assembly for continuous tape comprising a printing and reading head, said assembly having a width slightly greater than the width of said tape, means at the top of said assembly for moving said tape within said assembly, means for directing an air jet against said tape leaving said moving means so as to form successive folds of said tape, a conveyor disposed at the bottom of said assembly, means for driving said conveyor, said conveyor having a conveying surface substantially parallel to the bottom of said assembly, said conveying surface adapted to receive a portion of said tape and to convey it in a direction opposite to the movement of the air from said jet whereby said tape is formed in successive folds above said conveyor without jamming at either end of said assembly.

2. A record tape assembly as defined in claim 1 further comprising a fixed flat member parallel to the upper part of the conveyor and spaced a small distance above said conveyor, and extending over a certain length from that end of the assembly where the transportation of the tape ends, the said length being predetermined so that a certain amount of tape can be pushed on the said member by the following mass of tape until the first folds have arrived at said end, whereupon the amount of tape located on said member is sufficient to substantially stop the remaining part of the tape despite the continuous movement of the conveyor which then slides underneath the mass of said tape.

3. A record tape assembly as defined in claim 1 further comprising a partition underneath said air jet directing means to prevent the tape in the container from being sucked under the said air jet whereby said partition aids in directing said air jet away from said moving means.

4. A record tape assembly as defined in claim 3 further comprising means for directing an air jet onto said tape before it enters the moving means in order to substantially flatten the trajectory of the tape before its entry into said moving means.

5. A record tape assembly and magazine therefor for assemblies of continuous record tape comprising a chassis, a plurality of tape assemblies, each of said assemblies having a width slightly greater than the width of said tape, means at the top of each of said assemblies for moving said tape within said assemblies, means in each of said assemblies for directing an air jet against said tape leaving said moving means so as to form successive folds of said tape, said chassis and said assemblies being provided with plug in coupling, said couplings being provided with means to supply power for said moving, driving, and air jet directing means, said chassis having means for guiding each of said assemblies towards said plug in couplings, a platform pivotally connected to said chassis having a retracted and a normal position, said platform having guiding means which are aligned with said guiding means of said chassis when said platform is in a retracted position whereby said assembly when inserted in said chassis cooperates first with the guiding means of said platform and then with the guiding means of said chassis, and said platform adapted to pivot in its normal position after said assembly is inserted into said chassis.

References Cited in the file of this patent

UNITED STATES PATENTS

| | | |
|---|---|---|
| 284,323 | Palmer | Sept. 4, 1883 |
| 1,873,057 | Smith | Aug. 23, 1932 |
| 2,180,601 | Mitchell et al. | Nov. 21, 1939 |
| 2,377,896 | Metzner | June 12, 1945 |
| 2,419,012 | Dodegge | Apr. 15, 1947 |
| 2,542,506 | Gibson | Feb. 20, 1951 |
| 2,808,259 | Wengel | Oct. 1, 1957 |
| 2,867,435 | Gleason | Jan. 6, 1959 |

FOREIGN PATENTS

| | | |
|---|---|---|
| 523,526 | Belgium | Apr. 15, 1954 |